March 19, 1963

C. WHEATLEY 3,081,791

BUTTERFLY VALVE

Filed Feb. 5, 1959

INVENTOR.
Charles Wheatley
BY
C. M. McKnight
ATTORNEY

March 19, 1963     C. WHEATLEY     3,081,791
BUTTERFLY VALVE

Filed Feb. 5, 1959     2 Sheets-Sheet 2

INVENTOR.
Charles Wheatley
BY
C. M. McKnight
ATTORNEY

United States Patent Office 3,081,791
Patented Mar. 19, 1963

3,081,791
BUTTERFLY VALVE
Charles Wheatley, 414 S. Detroit, Tulsa, Okla.
Filed Feb. 5, 1959, Ser. No. 791,424
5 Claims. (Cl. 137—454.2)

This invention relates to improvements in valves, and more particularly, but not by way of limitation, to an improved butterfly valve provided with a replaceable seal member and seating portion.

For many years valves of the butterfly type depended upon a metal to metal contact between the closure member and the valve seating portion for sealing the valve against fluid leakage. As a result, the butterfly valves were not usually considered efficient for utilization under high pressure conditions, but were substantially limited in their usage to low pressure conditions. In order to overcome this disadvantage, many butterfly valves were provided with an annular seal member disposed around the outer periphery of the closure member and adapted to cooperate with the valve seating portion for a more efficient sealing of the valve. It has been found in actual practice, however, that the seal members frequently become dislodged from the closure members which results in a leakage of fluid through the valve. In addition, the seal members often become worn after a considerable period of usage, and are, therefore, inefficient in sealing of the valve. Normally the entire valve must be disassembled in order to replace the seal and obtain an efficient operation of the valve.

The present invention contemplates a novel butterfly valve particularly designed and constructed for facilitating the replacement of the seal member therein without a complete disassembly of the valve structure. A removable plate member is provided on the closure member and disposed adjacent the seal member in such a manner that the seal member is retained on the closure member without the possibility of accidental loss of the seal. In addition, the plate member may be readily removed while the closure member is assembled within the valve body, thereby permitting an easy removal of the seal member for replacement thereof. Furthermore, the seating portion of the novel valve may be readily replaced in the event that the seat has become worn or otherwise damaged during usage. It will be apparent that the efficient and useful life of the valve will be greatly increased.

It is an important object of this invention to provide a novel butterfly valve which is particularly designed and constructed to facilitate the replacement of the seal member thereof.

It is another object of this invention to provide a buterfly valve wherein the seal member is securely retained therein to substantially preclude any accidental loss thereof during usage.

Another object of this invention is to provide a butterfly valve wherein the seal member may be readily replaced without a complete disassembly of the valve structure.

Still another object of this invention is to provide a butterfly valve wherein the seating portion thereof may be readily removed for replacing thereof.

A further object of this invention is to provide a novel butterfly valve which is simple and efficient in operation and economical and durable in construction.

Other objects and advantages of the invention will be evident from the following detailed description, read in conjunction with the accompanying drawings, which illustrate my invention.

Figure 1:
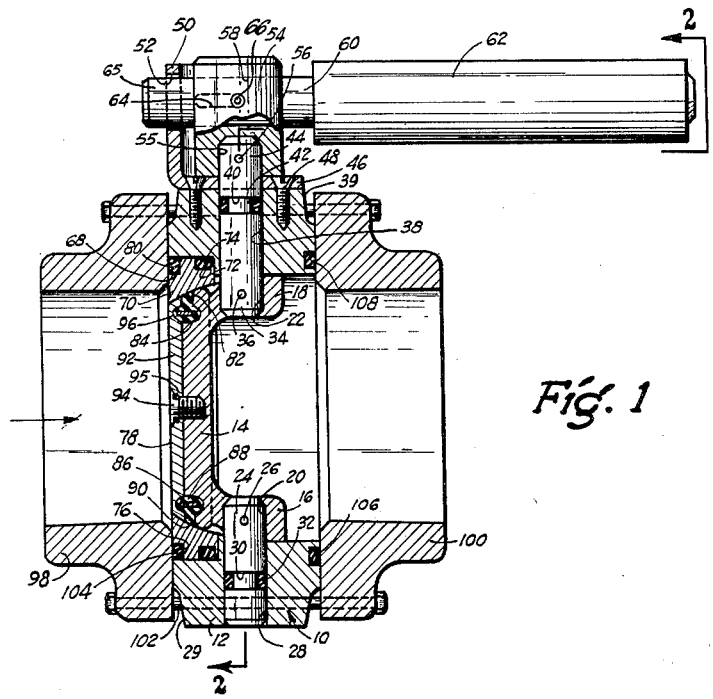
FIGURE 1 is a sectional view partly in elevation of a butterfly valve embodying the invention.
Figure 2:
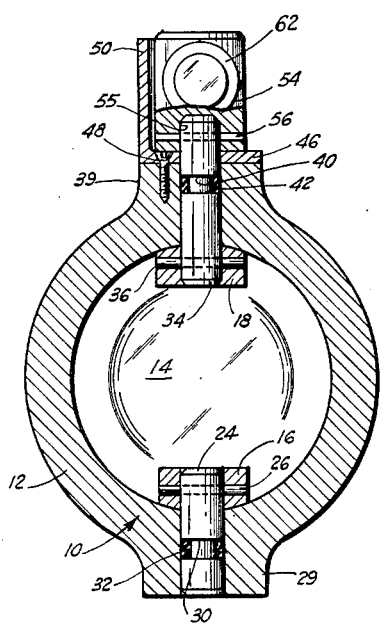
FIGURE 2 is a sectional view taken on line 2—2 of FIG. 1, with portions thereof depicted in elevation for purposes of illustration.

Referring to the drawings in detail, reference character 10 refers in general to a butterfly valve comprising a substantially cylindrical body or housing 12 having a closure member 14 pivotally secured therein. The closure member 14 is of a disc shaped configuration and is provided with a pair of diametrically opposed axially extending flange members 16 and 18 which are preferably integral therewith, but not limited thereto. The flanges 16 and 18 extend rearwardly or in a right hand direction from the disc 14, as viewed in FIG. 1, and are provided with a pair of transversely extending aligned apertures 20 and 22. A pivot pin 24 is rigidly secured within the aperture 20 in any suitable manner, such as by a transverse pin member 26, and extends downwardly, as viewed in the drawings, through a bore 28 provided in the body 12. The bore 28 extends transversely through the body 12 and through an outwardly extending circular boss 29 provided on the outer periphery of the body 12. An annular groove 30 is provided on the pin 24 for receiving an O-ring sealing member 32 to preclude leakage between the pin 24 and the bore 28. The pivot pin 24 rotates freely within the bore 28, and due to the rigid connection between the pin 24 and the flange 16, the disc member 14 is thus pivotally secured within the body 12.

A second pivot pin 34 is rigidly secured in the aperture 22 by a pin member 36, or the like, and extends upwardly, as viewed in FIG. 1, through a transverse bore 38 provided in the body 12. The bore 38 is preferably in axial alignment with the bore 28, and extends through an outwardly extending circular boss 39 provided on the outer periphery of the body 12. An annular groove 40 is provided on the pivot pin 34 for receiving an O-ring seal 42 therein to preclude leakage of fluid between the pin 34 and the bore 38. The pivot pin 34 rotates freely in the bore 38, and due to the rigid connection with the flange 18, cooperates with the pivot pin 24 for pivotally securing the disc 14 within the body 12.

The upper portion 44 of the pivot pin 34 extends above the boss member 39, as clearly shown in FIG. 1. An annular plate 46 is disposed around the upper portion 44 of the pin 34 and is secured to the boss 39 in any suitable manner, such as by a plurality of circumferentially spaced screws 48. An arcuate flange 50 extends upwardly from the plate 46, and is provided with a plurality of spaced apertures 52 for a purpose as will be hereinafter set forth. A stud member 54 is provided with a central bore 55 extending longitudinally therein for receiving the upper end 44 of the pin 34. The stud 54 is rigidly secured to the pin 34 by a transversely extending pin member 56.

A transverse bore 58 is provided in the stud 54 and is spaced above the longitudinal bore 55 for receiving the shank 60 of a suitable handle member 62. A longitudinal slot 64 is provided in the shank 60 and spaced from the outer extremity or end 65 thereof for receiving a pin member 66 therein. The pin 66 extends transversely through the stud 54 and into the bore 58 for disposition in the slot 64, and is preferably threaded, or otherwise suitably retained securely within the stud 54. It will be apparent that the slot 64 cooperates with the pin 66 to provide for a limited longitudinal movement of the shank 60 within the bore 58, and simultaneously precludes relative rotative movement therebetween. The outer end 65 of the shank 60 extends through one of the apertures 52 of the arcuate flange 50 depending upon the position of the handle 62 with respect thereto, as will be hereinafter set forth, thereby securely retaining the handle 62 in substantially any desired position.

It will be apparent that rotation of the handle 62 in a plane perpendicular to the axis of the stud 54 will rotate the stud 54. The stud 54 is rigidly secured to the pivot pin 34, as hereinbefore set forth, and thus rotation of the stud 54 is transmitted to the pivot pin 34. The pin 34 is rigidly secured within the aperture 22 of the flange 18, which in turn is rigid with respect to the disc 14. Therefore, rotation of the handle 62 will rotate the disc 14 within the body 12 to provide alternate open and closed positions for the valve 10.

The inner periphery of the body 12 is enlarged at 68 to receive an annular valve seat member 70 therein. The valve seat 70 is preferably constructed from a suitable non-corrosive material, such as bronze, or the like, but not limited thereto, and is disposed in the recess 68 in a sliding fit, thereby facilitating the removal and replacement of the valve seat 70 in the event the seat becomes worn or otherwise damaged. A circumferential groove 72 is provided on the outer periphery of the seat 70 to receive an O-ring seal 74 to preclude fluid leakage between the body 12 and the valve seat 70. An annular groove 76 is provided on the exposed face 78 of the seat 70 to receive an O-ring seal member 80 for a purpose as will be hereinafter set forth. The inner periphery of the seat member 70 is arcuate or of a substantially spherical configuration for cooperation with the closure disc 14 as will be hereinafter set forth.

An annular groove 82 is provided on the disc 14 and oppositely disposed from the flange members 16 and 18. The groove 82 is enlarged at 84 to receive a sealing ring 86 therein. The sealing ring 86 is preferably of the type disclosed in my co-pending application Serial No. 534,131 entitled "Flanged Sealing Ring" and filed September 13, 1955, now Patent No. 2,886,284, but not limited thereto. The sealing ring 86 comprises an inner core member 88 of a rigid material encased within an outer resilient covering 90. The seal 86 is substantially T-shaped in cross section, as clearly shown in the drawings, and the configuration of the annular groove 82 and the enlarged portion 84 thereof facilitate retaining the ring 86 securely in position on the disc 14 as will be hereinafter set forth.

A circular plate member 92 is removably secured to the disc 14 adjacent the groove surface thereof by a screw 94, or the like. An O-ring seal 95 is disposed around the screw 94 to preclude leakage therearound. An annular groove 96 is provided in the plate 92 adjacent the enlarged portion 84 of the groove 82. The groove 96 is complementary to the enlarged portion 84 for cooperation therewith to retain the seal 86 securely on the disc 14, as will be apparent in FIG. 1. The outer periphery of the disc 14 and the plate 92 are of an arcuate or substantially spherical configuration complementary to the configuration of the inner periphery of the valve seat 70, for a purpose as will be hereinafter set forth. The seal ring 86 bears against the inner periphery of the seat 70 in a closed position of the disc 14 to assure an efficient sealing of the valve 10.

The valve 10 is adapted to be interposed in a flow line (not shown) in any well known manner. As shown in FIG. 1, the valve 10 is usually disposed between a pair of opposed flanged sleeve members 98 and 100. A plurality of spaced bolts or stud members 102 normally extend through the flanged sleeves 98 and 100 and span the distance therebetween for securely clamping the valve body 12 between the flanged members. An O-ring seal member 104 is disposed in the annular groove 76 of the valve seat 70 and adjacent the flanged sleeve 98 to preclude leakage of fluid between the sleeve 98 and the valve body 12. A similar O-ring seal 106 is disposed in an annular groove 108 provided in the body 12 adjacent the flange 100 for precluding leakage therebetween. The flanged sleeves 98 and 100 may be interposed in the flow line in any well known manner (not shown). It will be apparent that the flanged connection members 98 and 100 may be of any suitable type, and are not limited to the sleeves depicted herein.

*Operation*

The valve 10 is interposed in a flow line (not shown) as hereinbefore set forth. When it is desired to close the valve 10, the handle 62 is manually rotated in a horizontal plane to a position substantially parallel to the longitudinal axis of the valve 10 and the flow line. The disc member 14 is rotated simultaneously with the handle 62 through the rigid connection with the pivot pin 34, and moves to a full closed position, as shown in FIG. 1, when the handle 62 is disposed parallel to the longitudinal axis of the valve 10. The apertures 52 of the arcuate flange 50 are so spaced that the end portion 65 of the shank 60 will be in alignment with one of the apertures 52 in the full closed position of the disc 14. The cooperation between the pin 66 and the slots 64 permits the shank 60 to be moved longitudinally whereby the end portion 65 may be inserted through the aligned apertures 52 for securely locking the handle in the position for closing of the valve 10. It will be apparent that a suitable locking pin, or the like, (not shown) may be provided for retaining the end portion 65 in the apertures 52 in order to preclude an accidental removal of the shank 60 therefrom, and thus prevent an accidental opening of the valve 10.

The flow of the fluid (not shown) through the valve 10 is in a direction from left to right as viewed in FIG. 1, and indicated by the arrow. Thus, the fluid strikes the closed disc 14 adjacent the plate 92. The seal member 86 efficiently precludes leakage of the fluid around the disc 14, and the rigid inner core 88 securely retains the seal 86 within the aligned grooves 84 and 96 to preclude any loss of the seal 86 during utilization of the valve.

When it is desired to open the valve 10, the shank 60 is moved longitudinally a sufficient distance to remove the end portion 65 thereof from the apertures 52, thus releasing the handle 62 for rotation in a horizontal plane. The handle 62 may be rotated through any desired angle in order to obtain substantially any degree of open position for the valve 10. As hereinbefore set forth, a plurality of the apertures 52 are provided in order that the handle 62 may be locked in a variety of open positions for the valve 10, thus varying the quantity of fluid passing therethrough in accordance with the operating requirements. The end portion 65 may be inserted in the aperture 52 which is in alignment therewith in order to retain the handle 62 in the desired position.

As the disc 14 is moved to an open position, the arcuate or spherical configuration of the inner periphery of the valve seat 70 and the outer peripheries of the disc 14 and plate 92 cooperate in such a manner that substantially half of the seal member 86 remains in contact with the inner periphery of the seat 70 until the disc 14 reaches approximately a one quarter open position, thus precluding dislodging of the seal from the fluid pressure passing through the valve. As the disc 14 moves toward a full open position, the seal 86 moves away from the valve seat 70. However, the rigid core 88 of the seal 86 positively precludes any dislodging of the seal from the complementary grooves 84 and 96.

Figure 3:
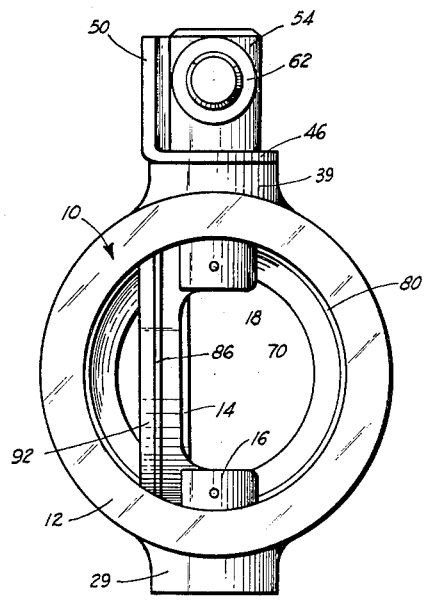
FIGURE 3 is an end elevational view of a butterfly valve embodying the invention and depicted in an open position.
Figure 4:
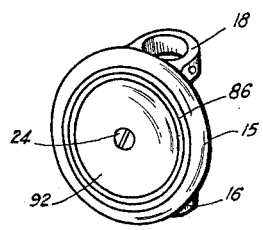
FIGURE 4 is a perspective view of the closure member of the novel valve.
Figure 5:
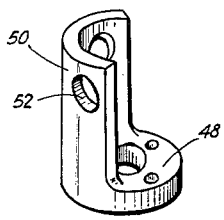
FIGURE 5 is a perspective view of the handle locking member of the valve.

With the disc 14 in a full open position, as shown in FIG. 3, the open area of the valve 10 exceeds the cross sectional area of the flow line with which the valve is utilized. This is particularly due to the fact that the disc 14 is pivotally secured within the valve body by means of the aligned pivot pins 24 and 34 whereby the disc 14 is off-set with respect to the diametrical center of the valve when the disc is in the full open position. In addition, there is no restriction in the valve between the flanges 16 and 18 since there is no direct axial connection extending between the pivot pins.

The seal member 86 may become worn during prolonged usage, and it may be desirable to replace the seal to improve the efficiency of the valve 10. The valve 10 need not be completely disassembled in order to replace the seal. The valve 10 is removed from the flow line in any well known manner (not shown) and the handle 62 is actuated to place the disc 14 in the full closed position. In this manner, the plate 92 may be easily removed by removing the screw 94 and manually lifting the plate from the disc. When the plate 92 is removed, the seal 86 is exposed, and the handle 62 may be actuated to turn the disc 14 until the seal 86 may be easily grasped with the fingers and removed from the groove 84. A new seal 86 may be readily disposed in the groove 84, and the plate 92 may be repositioned on the valve disc 14 and secured thereon by the screw 94. The valve 10 is then in condition for being replaced in the flow line.

The valve seating portion 70 may become worn or otherwise damaged after prolonged usage, and when it is desired to replace the seat 70, the valve 10 is removed from the flow line as hereinbefore set forth. The seat member 70 is disposed in the groove 68 in a sliding fit, and may be easily manually removed therefrom. It is preferable to rotate the handle 62 sufficiently to move the disc 14 to an open position, and the seat 70 may be grasped with the fingers for removal from the valve body 12. A new seat 70 may be readily inserted in the groove 68, and the valve 10 may be replaced in the flow line for continued operation.

From the foregoing, it will be apparent that the present invention provides a novel butterfly valve wherein the seal member is positively retained in position on the closure members for assuring an efficient sealing of the valve in a closed position. The seal member and the valve seating portion may be readily replaced without a complete disassembly of the valve, thereby greatly prolonging the useful life thereof. In addition, the open area of the valve exceeds the cross sectional area of the flow line with which it is utilized, thereby greatly improving the operational characteristics of the valve. The novel valve is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A butterfly valve comprising a substantially cylindrical body, a closure member pivotally secured within the body, means for pivoting the closure member to provide alternate positions of open and closed for the valve, a seating member slidably disposed within the body portion spaced from the pivot of the closure member for independent removal from the valve body, sealing means interposed between the seating member and the body, resilient sealing means provided on the closure member for cooperating with the seating portion to preclude leakage of fluid therebetween in the closed position for the closure member, and a plate member removably secured to the closure member for retaining the sealing means thereon and providing for independent removal of the sealing means therefrom upon removal of the seating member.

2. A butterfly valve comprising a substantially cylindrical body, a closure member pivotally secured within the body, means extending through the sidewalls of the body for pivoting the closure member to alternate positions of open and closed, a valve seating portion disposed in the body and spaced from the pivoting means for independent removal of the seating portion from the valve body, sealing means provided on the seating portion to preclude leakage of fluid between the body and the seating portion, resilient seal means provided on the closure member for cooperating with the seating portion to preclude leakage of fluid therebetween in the closed position of the closure member, and means removably secured to the closure member for precluding accidental dislodging of the seal means and to provide for an independent removal of the seal means from the closure member upon removal of the sealing member.

3. A butterfly valve comprising a substantially cylindrical body, a closure member pivotally secured within the body, a pair of diametrically opposed axially extending apertured flanges provided on the closure member, a pair of longitudinally aligned pivot pins rigidly secured in the apertured flanges and extending in opposite directions through the sidewalls of the body for pivoting the closure member, said pivot pins being rotatively journalled in the valve body, a valve seating portion slidably disposed in the valve body spaced from the pivot pins for independent removal from the valve body, seal means provided on the closure member for cooperation with the seating portion to preclude leakage of fluid in the closed position thereof, and a plate member removably secured to the closure member for precluding accidental dislodging of the seal means and providing for independent removal of the seal means upon removal of the seating portion.

4. A butterfly valve comprising a substantially cylindrical body, a closure member pivotally secured within the body, a pair of diametrically opposed axially extending apertured flanges provided on the closure member, a pair of longitudinally aligned pivot pins journalled in the opposite side walls of the body and rigidly secured in the apertured flanges, said pivot pins lying in a plane offset from the axis of the valve body, handle means rigidly secured to one of the pivot pins for rotation thereof, said pivot pins cooperating for rotation of the closure member to alternate positions of open and closed whereby the closure member is disposed in an offset position with respect to the diametrical center of the body in an open position, a valve seating portion slidably disposed in the valve body and spaced from the said pivot pins for independent removal thereof from the valve body, seal means provided on the closure member for cooperation with the seating portion to preclude leakage of fluid in the closed position thereof, means for precluding an accidental dislodging of the seal means, plate means removably secured to the closure member to permit independent removal of the seal means upon removal of the valve seating portion, and said seating portion and closure member and plate means provided with complementary arcuate surfaces for enhancing the sealing action of the seal means in the closed position of the valve.

5. A butterfly valve comprising a substantially cylindrical body, a closure member pivotally secured within the body, a pair of diametrically opposed axially extending apertured flanges provided on the closure member, a pair of longitudinally aligned pivot pins journalled in the opposite sidewalls of the body and rigidly secured in the apertured flanges, handle means rigidly secured to one of the pivot pins for rotation thereof whereby the closure member is moved to alternate positions of open and closed, a valve seating portion slidably disposed in the valve body and spaced from the pivot pins for independent removal thereof from the valve body, said seating portion provided with seal means adjacent to the valve body to preclude fluid leakage therebetween, an annular seal ring provided around the outer periphery of the closure member for cooperating with the seating portion in a closed position of the closure member for precluding leakage of fluid through the valve, a plate member removably secured to the closure member adjacent the seal ring to permit independent removal thereof upon removal of the seating portion, and said plate member and closure member and seating portion provided with complementary arcuate surfaces for increasing the sealing action of the seal ring in the closed position of the valve.

References Cited in the file of this patent

UNITED STATES PATENTS

| | | |
|---|---|---|
| 2,302,695 | Kalix | Nov. 24, 1942 |
| 2,339,666 | Anderson | Jan. 18, 1944 |
| 2,438,672 | Margrave | Mar. 30, 1948 |
| 2,730,119 | Bredtschneider | Jan. 10, 1956 |
| 2,740,423 | Stillwagon | Apr. 3, 1956 |
| 2,820,605 | Dougherty | Jan. 21, 1958 |
| 2,840,338 | Shaw | June 24, 1958 |
| 2,853,267 | Herren | Sept. 23, 1958 |
| 2,883,149 | Fiorentini | Apr. 21, 1959 |
| 2,886,284 | Wheatley | May 12, 1959 |
| 2,912,218 | Stillwagon | Nov. 10, 1959 |
| 2,936,153 | Gaffin | May 10, 1960 |

FOREIGN PATENTS

| | | |
|---|---|---|
| 245,650 | Great Britain | Jan. 14, 1926 |
| 552,878 | Belgium | Dec. 15, 1956 |
| 689,630 | Great Britain | Apr. 1, 1953 |